(12) United States Patent
Wieczorek (10) Patent No.: US 10,144,354 B2
(45) Date of Patent: Dec. 4, 2018

(54) PIVOTABLE INTERIOR MIRROR FOR A MOTOR VEHICLE

(71) Applicant: SMR Patents S.à.r.l., Luxembourg (LU)

(72) Inventor: Romeo Wieczorek, Esslingen (DE)

(73) Assignee: SMR Patent S.à.r.l., Luxembourg (LU)

( * ) Notice: Subject to any disclaimer, the term of this patent is extended or adjusted under 35 U.S.C. 154(b) by 0 days.

(21) Appl. No.: 15/301,531

(22) PCT Filed: Apr. 2, 2015

(86) PCT No.: PCT/IB2015/052439
§ 371 (c)(1),
(2) Date: Oct. 3, 2016

(87) PCT Pub. No.: WO2015/151059
PCT Pub. Date: Oct. 8, 2015

(65) Prior Publication Data
US 2017/0028923 A1    Feb. 2, 2017

(30) Foreign Application Priority Data
Apr. 3, 2014 (EP) .................................. 14163459

(51) Int. Cl.
*B60R 1/08* (2006.01)
*B60R 1/12* (2006.01)
(Continued)

(52) U.S. Cl.
CPC ............ *B60R 1/087* (2013.01); *B60R 1/04* (2013.01); *B60R 1/12* (2013.01); *G06F 3/017* (2013.01);
(Continued)

(58) Field of Classification Search
None
See application file for complete search history.

(56) References Cited

U.S. PATENT DOCUMENTS

2002/0005999 A1* 1/2002 Hutzel ................ B60R 1/12
359/838
2011/0286676 A1* 11/2011 El Dokor ............ G06F 3/017
382/225

FOREIGN PATENT DOCUMENTS

DE    102011089195 A1    1/2013
EP    0286401 A2    12/1988
(Continued)

OTHER PUBLICATIONS

International Search Report for PCT/IB2015/052439 dated Oct. 23, 2015.
(Continued)

*Primary Examiner* — Mussa A Shaawat
*Assistant Examiner* — Kyung J Kim
(74) *Attorney, Agent, or Firm* — Jones Day (57) ABSTRACT

A pivotable interior mirror for a vehicle includes a mirror surface, for example in the form of a first surface of a wedge mirror, a sensor device suitable for a light propagation-time measurement, for sensing at least one gesture of a driver of the vehicle and/or light incident on the first surface of the wedge mirror, and a pivoting device for pivoting the mirror surface from a normal position into at least one dimming position, in which blinding of the driver by light reflected at the mirror surface is reduced, wherein the pivoting device can be activated in dependence on at least one output signal of the sensor device. Further, a vehicle may include such an interior mirror and a method for using such an interior mirror is described.

15 Claims, 9 Drawing Sheets

(51) Int. Cl.
　　　*G06F 3/01*　　　(2006.01)
　　　*B60R 1/04*　　　(2006.01)
　　　*G06F 3/03*　　　(2006.01)
(52) U.S. Cl.
　　　CPC .... *G06F 3/0304* (2013.01); *B60R 2001/1223* (2013.01)

(56) References Cited

FOREIGN PATENT DOCUMENTS

| | | |
|---|---|---|
| EP | 1013503 A1 | 6/2000 |
| EP | 1593550 A1 | 9/2005 |

OTHER PUBLICATIONS

Written Opinion of the International Searching Authority for PCT/IB2015/052439.
European Search Report (EP 14163459), 2 pgs.

* cited by examiner

PIVOTABLE INTERIOR MIRROR FOR A MOTOR VEHICLE

CROSS-REFERENCE TO RELATED APPLICATIONS

This application is a national stage entry of International Patent Application No. PCT/IB2015/052439, filed Apr. 2, 2015, which claims the benefit of European Patent Application No. EP 14 163 459.2, filed Apr. 3, 2014, the disclosures of each of which is incorporated herein by reference in their entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present invention relates to a pivotable interior mirror for a motor vehicle, a motor vehicle with such a pivotable interior mirror and a method for such an interior mirror.

2. Description of Related Art

Driver assistance systems perceive the surroundings of a motor vehicle on the basis of environmental sensors by means of radar, video, infrared and ultrasound, and interpret them. They provide assistance to the driver in many driving situations and thus increase driving comfort and driving safety. Driver assistance systems contribute to increased safety by providing assistance to a driver in critical situations in which quick and confident action is required. In hazardous situations in which, for example, the driver's reaction times are impaired by the sudden occurrence of glare from a motor vehicle driving behind them, assistance for the driver from technical aids is desirable.

EP 1 593 550 A1 relates to an interior mirror for a motor vehicle with a support arm which can be mounted in a motor vehicle and with an adjuster which is adjustably positioned on the support arm, wherein a wedge mirror is attached directly or indirectly to the adjuster, the wedge mirror can be adjusted between a normal position and a dimming position through actuation of the adjuster, there is a drive device intended for actuating the adjuster, and there is at least one elastic tensioning element with which the adjuster is elastically tensioned in the normal position and/or the dimming position. The drive device can thereby be controlled by a light-sensitive sensor, in particular a differential light sensor. A circuit for adjustment of an interior mirror between a normal position and a dimming position is described in EP 0 286 401 A2.

A motor vehicle interior mirror according to EP 1 013 503 A1 has a supporting body for a reflective panel which can be moved under the action of a spring in order to be moved into a dimming position after activation of a shape memory wire.

DE 10 2011 089 195 A1 describes a device and a method for touch-free sensing of objects and/or persons in order to execute a desired operating action.

SUMMARY

The purpose of this invention is provide the driver with a means of averting a hazardous situation as a result of glare from a motor vehicle driving behind them.

This purpose is fulfilled by a pivotable interior mirror for a motor vehicle which is equipped with a mirror surface, in particular in the form of a sensor device suitable for a light propagation time measurement for sensing at least one gesture of a driver of the vehicle and/or light incident on the first surface of the wedge mirror, and a pivoting device for pivoting the mirror surface from a normal position into at least one dimming position in which blinding of the driver by light reflected at the mirror surface is reduced, wherein the pivoting device can be activated in dependence on at least one output signal of the sensor device, wherein the sensor device is suitable for a light propagation time measurement and is a part of a control unit for the pivoting device, and wherein the control unit detects movement patterns within a first area of the interior mirror and/or provides at least one virtual button within a second area of the interior mirror.

Thereby, provisions can be made for the sensor device to include at least one first sensor in the form of a TOE sensor, in particular including a TOE camera, wherein the sensor device preferably also includes at least one second sensor in order to fulfil an ALS function.

The first sensor can be attached to the side of the interior mirror presenting the mirror surface, in particular to the mirror surface, and/or a first second sensor can be attached to the side of the interior mirror presenting the mirror surface, in particular to the mirror surface, and/or a second second sensor can be attached to the side of the interior mirror opposite the mirror surface, in particular to the surface of the wedge mirror opposite the mirror surface, wherein the first sensor and the first second sensor are preferably shaped as one.

It is also recommended that the pivoting device can be activated in dependence on a comparison of the output signals from the first and at least one second sensor, preferably through subtraction, and/or the pivoting device can be activated in dependence on a comparison of the output signals from the first second and second second sensor, preferably through subtraction.

It is also advantageously recommended that the pivoting device can be activated in dependence on signals from a device in the motor vehicle which is characteristic of the lighting conditions in the environment of the vehicle, in particular including an illuminating device for the vehicle, for example in the form of headlights and/or vehicle interior lighting and/or an internal clock and/or a positioning device.

Preferred interior mirrors according to the invention are characterized in that the control unit preferably detects movement patterns on the mirror surface within a first distance interval and/or provides at least one virtual button within a second distance interval wherein the first distance interval is provided in the first area of the control unit and the second distance interval is provided in the second area of the control unit.

Thereby, the second distance interval can be positioned closer to the mirror surface than the first distance interval.

Furthermore, provision can be made for the pivoting device to include a shape memory actuator for pivoting the mirror surface, wherein the shape memory actuator preferably comprises a shape memory wire which changes in length in response to a current flow through the shape memory wire.

Thereby, provision can be made for the control unit to be designed to supply the shape memory wire with current, in particular from a vehicle power supply.

It is also recommended that the shape memory wire is coiled on a first thread roll and causes a rotational movement of the first thread roll in response to the current flow, wherein the first thread roll preferably forms a drive axle in the interior mirror and is designed to rotate the mirror surface by at least a first angle of rotation.

Thereby, provision can be made for the shape memory wire to be coiled into a second thread roll which is designed to rotate the mirror surface by at least a second angle of rotation, wherein the diameter of the second thread roll preferably differs from the diameter of the first thread roll.

The pivoting device can include a further actuator which is designed to move the mirror surface back into the normal position, wherein the further actuator preferably comprises a second shape memory actuator or a spring element.

The invention also provides a motor vehicle with a pivotable interior mirror according to the invention, which is characterized by a control device in connection with the sensor device, the control unit, a device which is characteristic of the lighting conditions in the environment of the vehicle, an illuminating device, for example in the form of headlights, and/or vehicle interior lighting, an internal clock and/or a positioning device.

Furthermore, the invention also provides a method for pivoting a pivotable interior mirror according to the invention for a motor vehicle according to the invention which is characterized by the following steps: detection of movement by a driver of a motor vehicle, in particular an arm movement by the driver towards the interior mirror or a finger movement within a specific area of the interior mirror, and/or the incidence of light on the interior mirror; and triggering of a movement of the interior mirror from a normal position into at least one dimming position and/or from the dimming position into the normal position in dependence on the result of the detection.

Thereby, provision can be made for a vehicle function, in particular the setting of an illumination device, and/or time information and/or a vehicle position to be taken into account in the change from the normal position to the dimming position, and/or a driver of the vehicle can choose whether the change from the normal position into the dimming position and/or from the dimming position into the normal position occurs automatically, by means of gesture control or through actuation of a virtual button, wherein an automatic change is preferably initiated when specific, predefined lighting conditions are detected.

This invention is based on the recognition that a dazzling effect can be cause by the interior mirror in a motor vehicle as a result of a vehicle driving behind the motor vehicle, particularly in the dark. If the interior mirror is turned to a dimming position, then the beam path is interrupted and the dazzling effect no longer occurs. In order to make the turn down easy and safe, an interior mirror according to the invention has a pivoting device which is designed to move the interior mirror from a normal position into a dimming position, wherein dazzling of the driver via the interior mirror is reduced in the dimming position. Furthermore, such an interior mirror has a sensor device which includes a control unit, for example, and which is designed to activate the pivoting device either automatically or in response to a movement by the driver. The motion-controlled activation thereby occurs by means of gesture control by the driver, for example as a result of a movement of the driver's arm or hand towards the interior mirror, or through actuation of a virtual button.

The following abbreviations and terms are used in order to describe the invention in detail:

SMA: Shape memory alloys (SMA; German: Formgedächtnislegierungen FGL), often also referred to as "memory metals" are special metals which can exist with two different crystalline structures and can seemingly "remember" a previous shape despite significant subsequent shaping.

LED: Light-emitting diode.

EC glass: Anti-glare electrochromic mirror glass.

TOF: Time of flight TOF sensors represent a sensor device for measuring distance by means of determination of time of flight.

ALS: Ambient light sensor sensors with an ALS function allow for brightness detection similar to a human eye.

An interior mirror with dimming function and gesture control which is very easy to operate for a driver is described below. In particular, the driver can start the actuator for a pivoting device with the help of gesture control through a simple hand movement towards the interior mirror, the pivoting device thus moving the mirror into a position in which the driver is no longer dazzled. The mirror can be moved silently through the use of an SMA actuator. In addition, this is significantly more cost-effective to produce than a mirror with EC glass.

The advantage of a gesture controlled interior mirror is that the driver of the motor vehicle can turn the interior mirror down with a simple movement in situations in which they are being dazzled by a vehicle driving behind them so that they are no longer dazzled. They can therefore reduce or entirely stop the glare by means of a simple gesture control independently of the visual perception which is impaired by the glare and remove themselves from the hazardous situation. The pivotable interior mirror is easy to operate. Just a simple movement of the arm or hand towards the interior mirror is sufficient to turn the interior mirror down.

It has proven to be particularly beneficial if the sensor which is used to detect a movement by the driver in order to be able to activate a pivoting device in response to a movement detected is a TOF sensor, so is suitable for light propagation time measurement. Such a sensor can be combined with an ALS sensor in order to detect both intensity and distance, whereby differentiation can be made between a passenger and a driver so that movements by a passenger can thus be ignored. Furthermore, the sensor responds equally to an object in black or white, and thus to a hand with or without a black glove, and is therefore ideal for detecting a driver's gesture.

In addition, a further ALS sensor can detect the brightness outside the motor vehicle, so the amount of light which is reaching the driver through the windscreen of their motor vehicle. By comparing this light with the light reflected by the interior mirror, an improvement can be achieved by turning it down. It is therefore also possible for the system to react to driving into or out of a tunnel.

BRIEF DESCRIPTION OF THE SEVERAL VIEWS OF THE DRAWINGS

Further design examples are explained with reference to the attached schematic drawings. They show:

FIG. 1b is a further representation of the interior mirror from FIG. 1a;

FIG. 2a is a plan view of a pivotable interior mirror for a motor vehicle according to a second embodiment according to the invention;

FIG. 2b is a sectional view though a wedge mirror in the interior mirror from FIG. 2a;

FIG. 2c is an enlargement of a section A from FIG. 2a;

DETAILED DESCRIPTION OF THE INVENTION

Figure 1A:
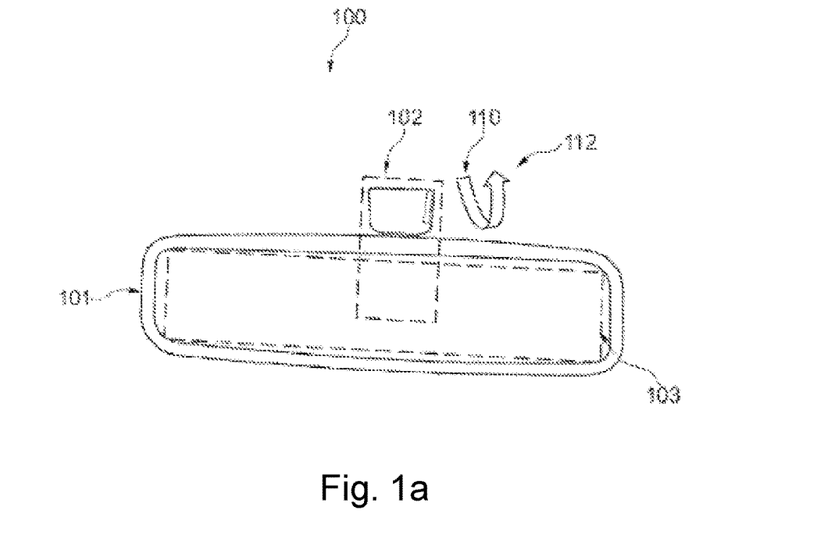
FIG. 1a is a representation of a pivotable interior mirror for a motor vehicle according to a first embodiment according to the invention.

FIG. 1a shows a schematic representation of a pivotable interior mirror 100 for a motor vehicle according to a first embodiment of the invention. The pivotable interior mirror 100 comprises a frame 101, a pivoting device 102 and a control unit 103. The pivoting device 102 can thereby move the interior mirror 100 including its wedge mirror 104 from a normal position 110 to a dimming position 112. The normal position 110 can be the position shown in FIG. 1a, in which the driver can easily identify vehicles driving behind them in daylight in the interior mirror 100. The dimming position 112 can be a position in which the degree to which the driver is dazzled by the headlights of vehicles following them reflected by the interior mirror 100 when driving at night is at least reduced. The dimming position 112 can thereby be a position in which the entire interior mirror 100, as shown in FIG. 1a, is turned upward so that the reflected beam path from the lights of another vehicle driving behind the motor vehicle to the driver's eyes is interrupted. The dimming position 112 can also be a position in which only the wedge mirror 104 is pivoted, including to one side or downward. A variety of angles of rotation or folding angles are possible.

The control unit 103 can be used by the driver to activate the pivoting device 102, in particular in response to a movement or gesture by the driver. The movement can be a movement of an arm or a hand towards the control unit 103. For example, the control unit 103 can react to a certain speed at which the driver's hand moves towards to control unit 103.

In an embodiment according to the invention, the pivoting device 102 can comprise a first shape memory actuator with which the interior mirror 100 can be moved into the dimming position 112. Such a shape memory actuator can comprise a shape memory alloy SMA (German: Formgedächtnislegierung FGL). It can thereby be a metal alloy which can exist in two different crystalline structures so that the first shape memory actuator remembers a previous shape despite significant subsequent shaping and can shift back to its original shape. The original shape can be the normal position 110, and the deformed shape can ensure the dimming position 112.

In a beneficial embodiment of the invention, the first shape memory actuator can comprise a shape memory wire, the length of which changes in response to a current flow through the shape memory wire. The current flow through the wire can cause a temperature increase in the wire so that it can extend. The control unit 103 can thus supply the shape memory wire with current in response to the driver's movement, for example through connection to the power supply in the motor vehicle. The shape memory wire can be coiled on a first thread roll and cause a rotational movement of the first thread roll in response to a current flow, for example as described below in FIGS. 3 to 7. The first thread roll can thereby form a drive axle of the interior mirror 100 and turn the interior mirror 100 by a first angle of rotation. The shape memory wire can also be coiled on a second thread roll which can turn the interior mirror 100 by a second angle of rotation. Thereby, the diameter of the second thread roll can differ from the diameter of the first thread roll, for example as described below in FIGS. 3 to 7.

The pivoting device 102 can include a further actuator which can move the interior mirror 100 from the dimming position 112 back into the normal position 110. The further actuator can thereby comprise a second shape memory actuator which can be constructed in the same manner as the first shape memory actuator described above.

It is also possible for the two shape memory actuators to be controlled independently of one another. The second shape memory actuator can therefore move the interior mirror 100 back into the normal position 110 after a certain amount of time. Alternatively, the second shape memory actuator can move the interior mirror 100 back into the normal position 110 depending on a glare situation, detectable by a sensor device for example, wherein this movement can also be detected by the sensor device. It is also possible for the second shape memory actuator to move the interior mirror 100 back into the normal position 110 in response to a movement by the driver. In one embodiment, the second shape memory actuator can move the interior mirror 100 back into the normal position 110 depending on cooling of the shape memory wire.

The further actuator can beneficially have a spring element. As a result, the spring element can move the interior mirror 100 back into the normal position 110 depending on cooling of the shape memory wire in the first shape memory actuator. The force of the spring element can in particular be judged against the force of the expansion of the shape memory wire in the first shape memory actuator in order to cause a slow return to the normal position 120 when the wire cools.

According to the invention, it is preferred that the control unit 103 has at least one sensor in the sensor device in order to be able to detect a movement by the driver, in particular an arm movement by the driver towards the interior mirror. The control unit 103 can thereby activate the pivoting device 102 according to a threshold value for the driver movement detected. For example, the pivoting device 102 can be activated so that the interior mirror 100 can move into the dimming position 112 when a predefined threshold value is exceeded.

Figure 1B:
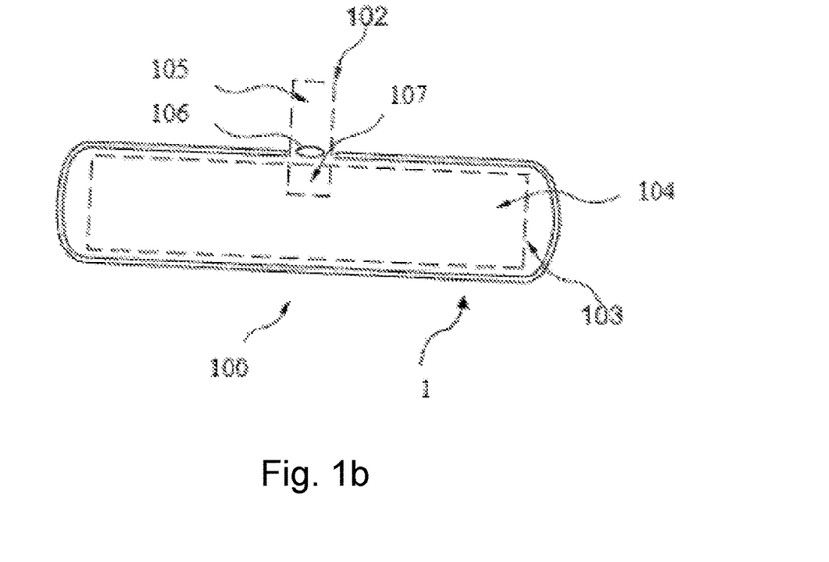

FIG. 1b shows a schematic representation of a gesture-controlled interior mirror 100 which, in accordance with FIG. 1a, comprises a pivoting device 102, a control unit 103, 107 and a wedge mirror 104. In this embodiment, the interior mirror also has an SMA wire actuator and is equipped with a sensor device in order to implement dimming using gesture control. The interior mirror 100 can thereby be turned down using a rotational movement such that the driver is no longer dazzled and the movement can be accomplished automatically by the pivoting device 102, even silently. In one embodiment, the driver can cause the interior mirror 100 to turn down, up or to the side not only from the normal position shown in FIG. 1*b* into a dimming position, not shown, but also back again using a hand movement or gesture, or even through proximity.

A possible interaction by the driver with the interior mirror 100 causing a movement of the interior mirror 100 is described below. When the driver makes a movement 1 in a specific manner in a first detection area of the control unit 103, also known as the gesture channel, the angle between a mirror mounting 105 and the wedge mirror 104 can change to the effect that a first surface of the wedge mirror 104 facing the driver shows a little more upwards to the roof of the motor vehicle so that the driver is no longer dazzled. The actuator for the pivoting device 102, which can be located behind the wedge mirror 104 in the interior mirror 100, can ensure this automatic movement. If the actuator is an SMA actuator in which the wire, which is located behind the wedge mirror 104, can be supplied with current when a gesture by the driver is detected by the sensor device in the control unit 103, the wire can heat up and shorten as a result, which is converted into a rotational movement at the pivot point 106 of the interior mirror 100. A further movement in the gesture channel for the sensor device can ensure that the interior mirror 100 turns back. Alternatively, rotating back can be compelled by the actuation of a virtual button in a second detection area of the control unit 107. The second detection area can thereby by located closer to the mirror surface of the wedge mirror 104 than the first detection area in order to better simulate a button.

Figure 2:
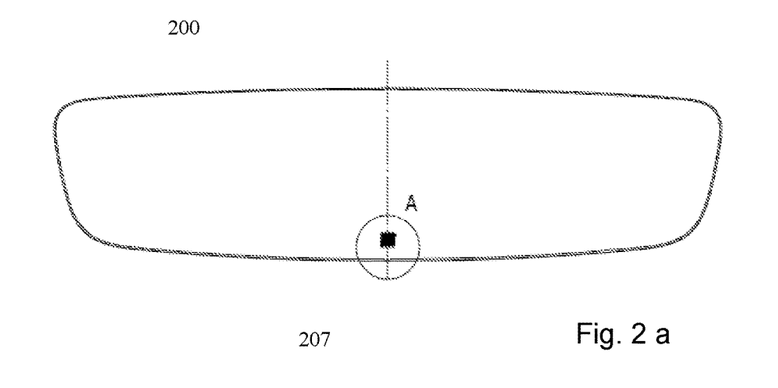

FIGS. 2*a* to 2*c* show a further interior mirror 200 according to the invention which includes an adjustable wedge mirror 204 and a sensor device 207. The wedge shape of the wedge mirror can be seen best in FIG. 2*b*. FIG. 2*b* also shows that the sensor device 207 includes a first sensor 208 on the first, mirrored surface of the wedge mirror 204 facing the driver, while a second sensor 209 is attached to the rear of the wedge mirror 204. The first sensor 208 can be a TOF sensor with ALS function, while the second sensor only needs to fulfil an ALS function. This opens up a broad spectrum for the activation of a pivoting device, not shown, which can however correspond to the pivoting device described in connection with FIGS. 1*a* and 1*b*. The sensors 208 and 209 can also be designed rolled into one.

Using the sensor 208, gesture control is possible on the one hand, namely for movements at a distance of more than 10 mm away from the wedge mirror 204. Within the range of 10 mm to the wedge mirror, a button function is performed with which, for example, gesture control of the pivoting device can be switched to fully automated control. For a fully automated solution, the first sensor 208 detects whether there is a glare situation and the wedge mirror 204 should be turned to its dimming position. Consideration of the output data from the second sensor 209 also allows the ambient light, so the light which is perceived through the windscreen of the motor vehicle, not shown, by the driver, to be taken into account. The output signals from the two sensor 208 and 209 can be evaluated together, for example using a differential circuit, in order to thus take special driving situations such as those which occur when driving into a tunnel and leaving a tunnel into account. Differentiation between day and night is therefore possibly through the second sensor 209. This differentiation can be taken into account when the wedge mirror 204 is turned, namely in connection with a threshold which needs to be exceeded to trigger turning and/or for a turning angle.

It is also possible according to the invention for the pivoting device to be operated not only depending on the output signals from the sensor device 207 but also taking into account additional signals such as information about a headlights and/or time signals using which it is also possible to determine whether it is day or night.

Figure 3:
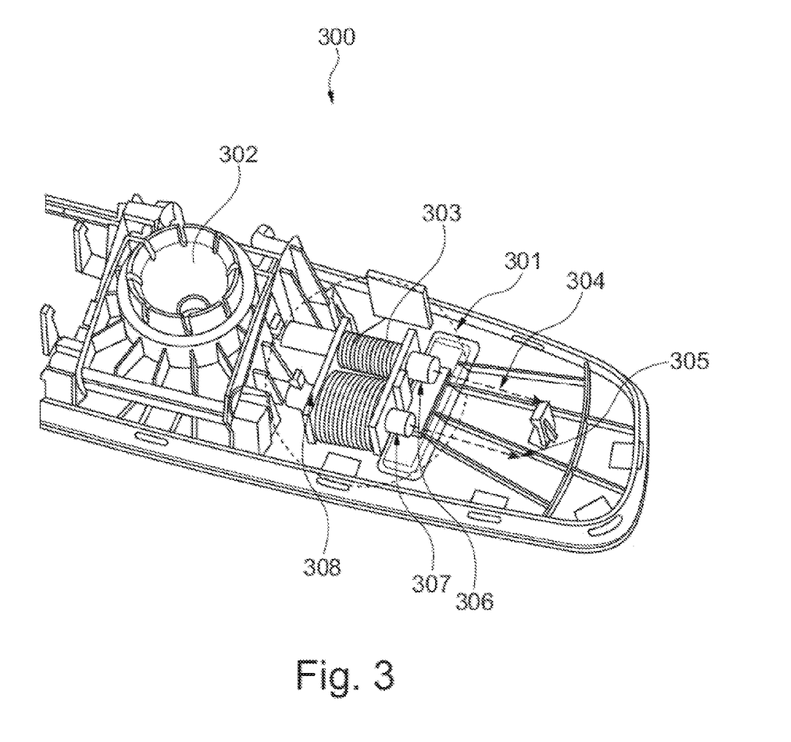
FIG. 3 is a three-dimensional representation of a gesture-controlled, pivotable interior mirror for a motor vehicle according to a third embodiment according to the invention.

FIG. 3 shows a three-dimensional representation of a gesture-controlled interior mirror 300 for a motor vehicle according to a further embodiment of the invention. The interior mirror 300 can have a design corresponding to the interior mirror 100 from FIG. 1*a* or 1*b*, or comprise the interior mirror 200 from FIGS. 2*a* to 2*c*. The housing of the interior mirror 300 is shown open in FIG. 3 so that various mechanical components which are located within the housing, not shown, are visible. The wedge mirror is attached to the side of a support plate 309 which is facing away from the observer and therefore not visible.

The interior mirror 300 has a drive 301 with which a ball joint 302 (shown in FIG. 3 by a calotte section and a spherical calotte or spherical bearing plate) can be turned in order to turn the interior mirror 300 accordingly. The drive 303 comprises an SMA wire and is designed as a yo-yo drive. A yo drive turns only in one direction while the other direction is pulled back with a spring, while a yo-yo drive has a second coil which turns in precisely the opposite direction so that the yo-yo drive can turn in both directions. In the embodiment in FIG. 3, the drive 301 comprises a first axle 304 and a second axle 305. The first axle 304 can be equipped with two coils which turn in different directions in order to implement a yo-yo drive. The second axle 305 can also be equipped with two coils which turn in different directions in order to implement a yo-yo drive.

The drive 301 in the pivoting device can perform a rotation of at least 90° and replaces a manual lever in a conventional dimming device. In the embodiment in FIG. 3, the drive 301 comprises 2 axles 304, 305, although more than two axles are also possible as well as just one axle 304. However, for a rotation of 90°, 2 axles are generally sufficient.

In the embodiment in FIG. 3, the drive 301 has two stable points at the end of the axles 304, 305 which engage with the calotte section of the ball joint 302. Accidental adjustment after rotation can thus be prevented.

The SMA wires 303 are coiled on the rolls 306, 307 which are arranged towards the two axles 304, 305 and can be heated by current pulses and thus shorten in order to perform a rotation of 90°.

The drive 301 comprises a support plate 308 which is used for fixing the wires 303 to the rolls 306, 307. The wires 303 are guided from the support plate 308 over the second roll 307 and then over the first roll 306 and are also fixed there. In one embodiment, a control unit can have its power connections on the support plate 308. The control system can then perform an exact measurement of the internal resistance in order to heat the wires 303 precisely and measure out the force.

Figure 4:
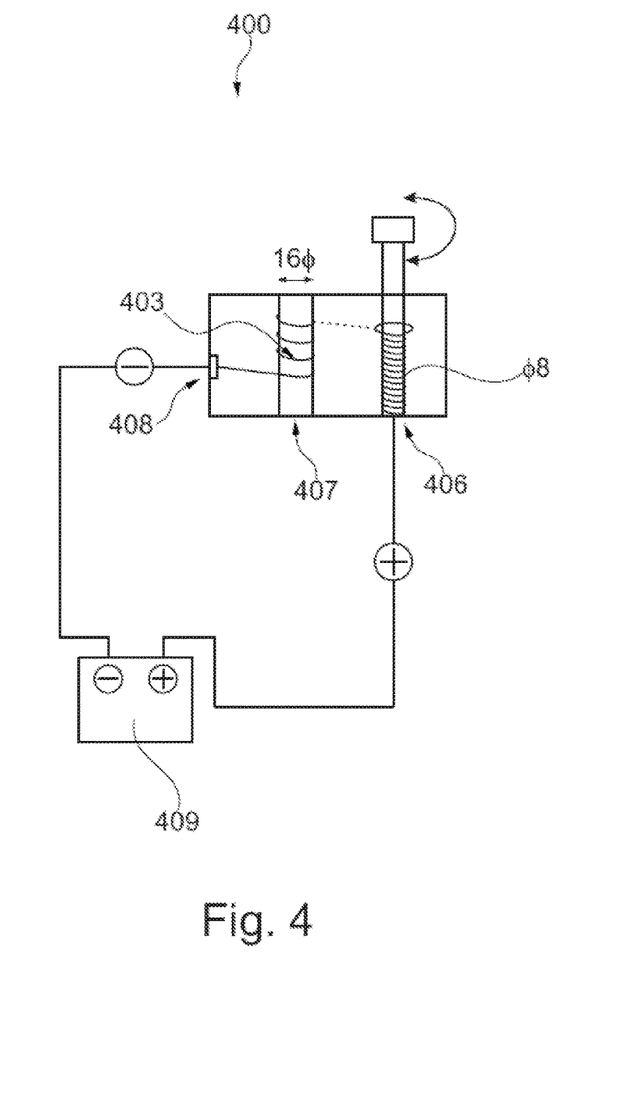
FIG. 4 is a plan view of a double axle mini yo for a gesture-controlled interior mirror according to the invention.

FIG. 4 shows a schematic representation in plan view of a two-axle mini yo 400 for a gesture-controlled interior mirror according to a further embodiment according to the invention. The mini yo 400 can be used in a drive 301 for the interior mirror 300, for example. As previously explained, the term yo means that the drive only turns in one direction and the other direction can be pulled back with a spring, for example, according to the representation in FIG. 7 for instance.

In the embodiment in FIG. 4, the mini yo comprises a first thread roll 406, corresponding for example to the first thread roll 306 shown in FIG. 3, and a second thread roll 407, corresponding for example to the second thread roll 307 shown in FIG. 3. Thereby, the second thread roll 407 is thicker than the first thread roll 406. The first thread roll 406 can, for example, have a diameter of 8 mm and the second thread roll has a diameter of 16 mm. Other thicknesses and diameters are also possible. The majority of a wire 403 forming coils is coiled onto the thicker second thread roll 407, while only a few coils are coiled onto the narrower first thread roll 406. The narrow first thread roll 406 can be designed as a drive axle and can be hollow in order to supply the wire 403 with current from the inside. The wire 403 is connected to a housing (fixation point 408 for example on a support plate 308 as described above for FIG. 3), where it is supplied with current, then transfers to the thicker second roll 407 where it has multiple coils and finally runs to the thinner first drive roll 406. There, it dips through a hole into the interior of the roll 406 and is guided outwards to a power supply 409. The power supply 409 can be provided by a car battery.

Figure 5:
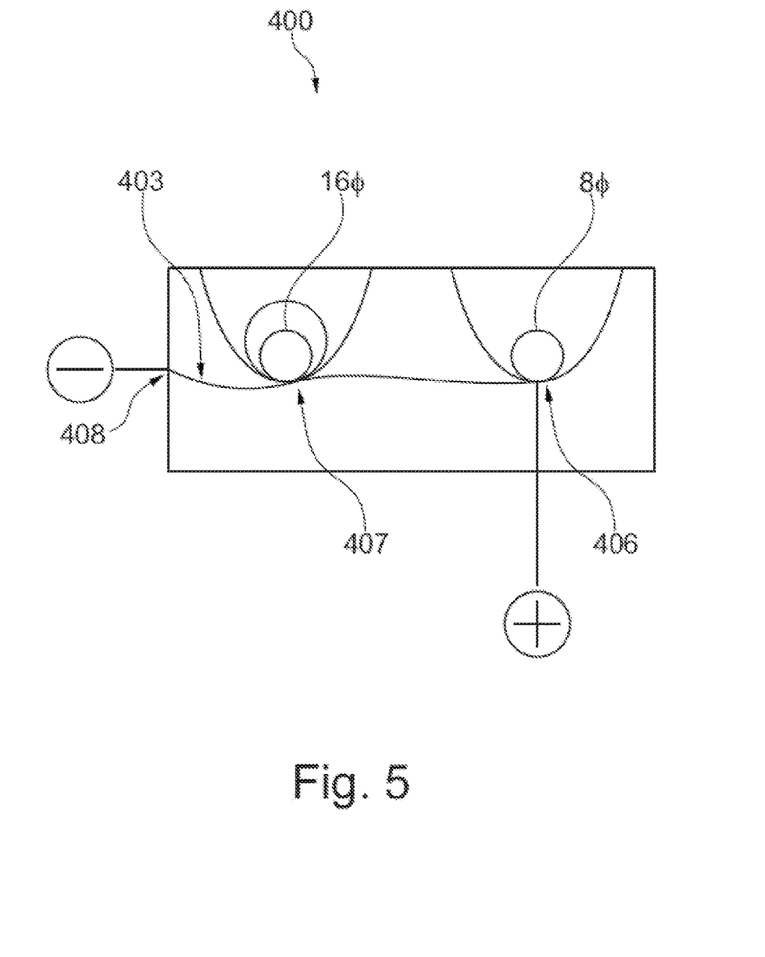
FIG. 5 is a side view of the double axle mini yo from FIG. 4.

FIG. 5 shows a schematic representation in side view of the two-axle mini yo 400 from FIG. 4. In the embodiment in FIG. 5, the wire 403 is firmly connected to the housing at the fixation point 408, where it is also supplied with current, after which it then runs over the thick second roll 407 where it has multiple coils and then continues to the narrow first drive roll 406. There, it dips into a hole in the interior of the roll 406 and is guided outward to the power supply 409. The supply cables for the power supply are labelled with the symbols "+" and "−".

Figure 6:
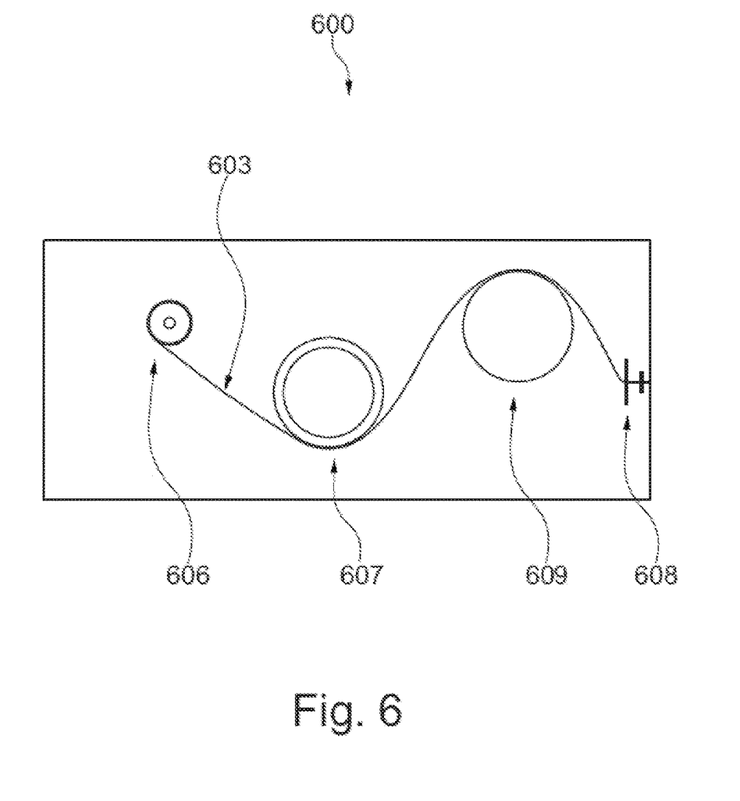
FIG. 6 is a plan view of a triple axle mini yo for a gesture-controlled interior mirror according to the invention.

FIG. 6 shows a schematic representation in plan view of a three-axle mini yo 600 for a gesture-controlled interior mirror according to a further embodiment according to the invention. The mini yo 600 can, for example, be used in a drive 301 for an interior mirror 300 as described in FIG. 3. The three-axle mini yo 600 can correspond to the two-axle mini yo from FIGS. 4 and 5 with the difference that a wire 603 is also guided over an additional third roll.

In the embodiment in FIG. 6, the wire 603 is firmly connected to the housing at a fixation point 608, where it is supplied with current, after which it then runs over the third roll 609 where is has multiple coils, on to the second roll 607 and then to the first roll 606 which can serve as a drive roll. There, it dips into a hole in the interior of the roll 606 and is guided outward to a power supply.

With the three-axle mini yo 600, a greater angle of rotation can be generated than with a two-axle mini yo. In an embodiment which is not shown in FIG. 6, the mini yo comprises additional axles in order to be able to realise an even greater angle of rotation.

The embodiments shown in FIGS. 4 to 6 can also be implemented as mini yo-yos, i.e. with two wires which each turn the opposite way to the other. Likewise, a spring element which slowly pulls the wedge mirror back into the original position can be used. In the variant with a spring element, the drive can be realised, for example, so that only the dimming position is reached using gesture control, while the original position (normal position) is automatically engaged again after a certain cooling time for the wire. In the variant with yo-yo, each gesture hand movement can define its position.

Figure 7:
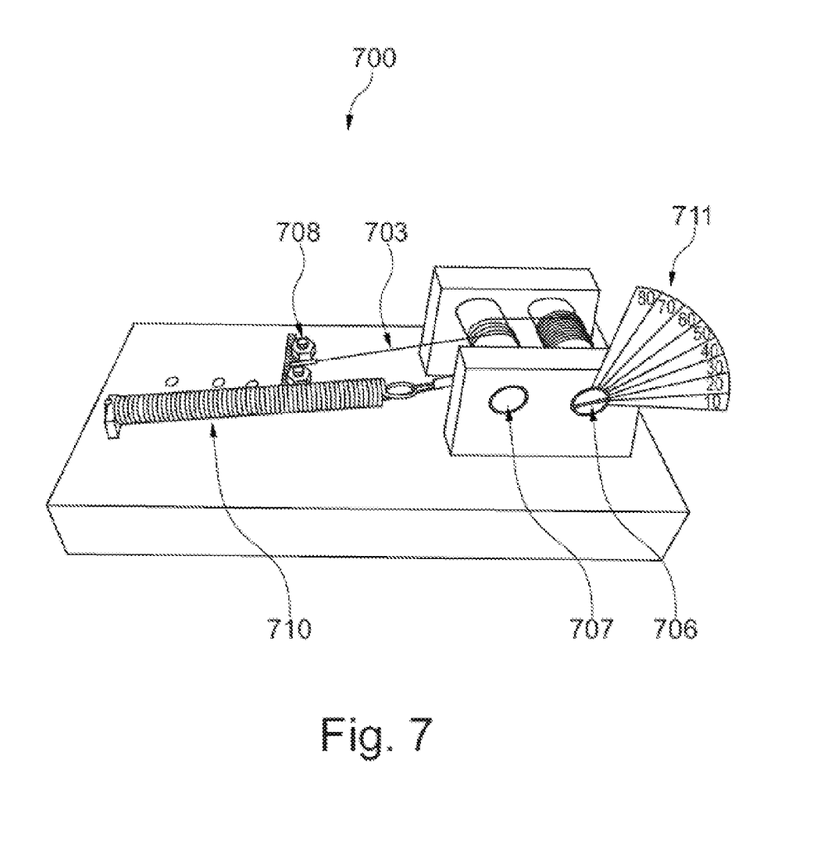
FIG. 7 is a three-dimensional representation of a drive for a gesture-controlled interior mirror which is realised as a yo with spring element.

FIG. 7 shows a three-dimensional representation of a drive 700 for a gesture-controlled interior mirror which is realised as a yo with spring element. The drive 700 can be used, for example, as a drive 301 for an interior mirror 100, 200, 300 as described in FIGS. 1 to 3.

In the embodiment in FIG. 7, a wire 703 is again firmly connected to the housing at a fixation point 708, where it is supplied with current, after which it then runs over a second roll 707 where it has multiple coils and on to a first roll 706 which can be used as a drive roll. There, it dips into a hole in the interior of the roll 706 and is guided outward to a power supply. The wire 703 with the two rolls 706, 707 forms the yo element which turns from a starting position (normal position) in one direction, while a spring element 710 causes it to turn back to the starting position. A variety of angles of rotation 711 can be realised using the drive 700, for example in a range from 0° to 90° as shown on the scale.

Figure 8A:
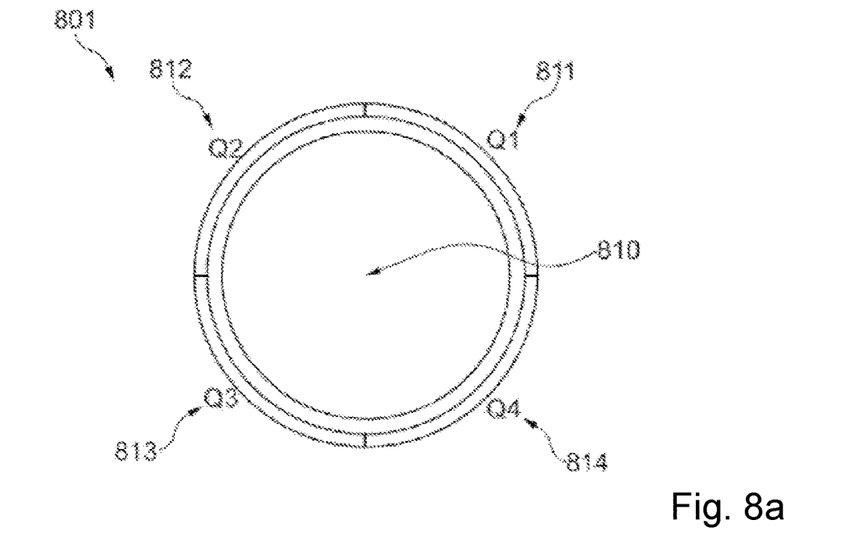
FIG. 8a is a representation of a sensor device for a gesture-controlled interior mirror according to the invention.

FIG. 8a shows a schematic representation of a first sensor 801 in a sensor device with light-emitting diodes 811, 812, 813, 814 and a TOF camera for a gesture-controlled interior mirror according to the invention. The sensor 801 can be used, for example, in an interior mirror 100, 200, 300 as described in FIGS. 1 to 3, namely as part of the control unit 103. In one embodiment, an LED array, with infrared light-emitting diodes for instance, can be used for gesture control in the interior mirror as shown in FIG. 8a.

For the LED technology shown in FIG. 8a, the LEDs 811, 812, 813, 814 can be used in order to illuminate a defined space in four quadrants Q1-Q4 and thus monitor it. The TOF camera 810 can be located in the centre as a receiver which can detect a change in the lighting conditions as a result of a movement by the driver, for example a hand movement. More precisely, for each of its pixels the TOF camera detects the time that the light emitted by the LEDs 811 to 814 takes to get to the hand and back again. This time is directly proportional to distance. As a result, gesture control can be implemented within a first predefined distance interval, while a virtual button can also be provided within the second predefined distance interval. Fully automated dimming can be engaged using a first button, for example; and dimming dependent on the motor vehicle's illumination device can be engaged using a second button, for example. A dimming position can thus be enforced in principle when the headlights are switched on and a normal position can be enforced in principle when the headlights are switched off.

The sensor 801 can detect intuitive movement patterns and control an actuator so that rotation of an interior mirror both from its normal position into its dimming position and back is possible.

Figure 8B:
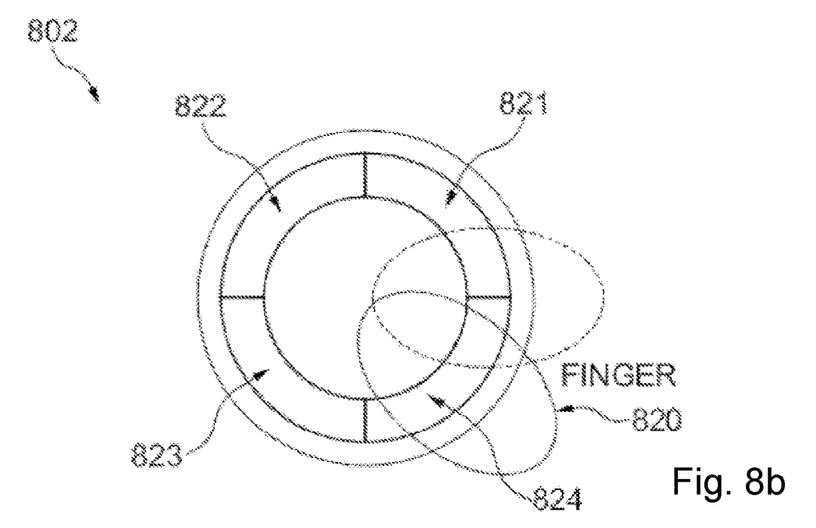
FIG. 8b is a representation of an alternative sensor device for a gesture-controlled interior mirror according to the invention.

FIG. 8b shows a schematic representation of an alternative sensor device 802 with four TOF sensors 821, 822, 823, 824 of which each detects the proximity and the position of a finger 820, for example, in a radius of up to about 20 cm and sends the corresponding X, Y and Z axis position data for the finger 820 to the electronics assembly. This can all occur in real time.

Figure 9:
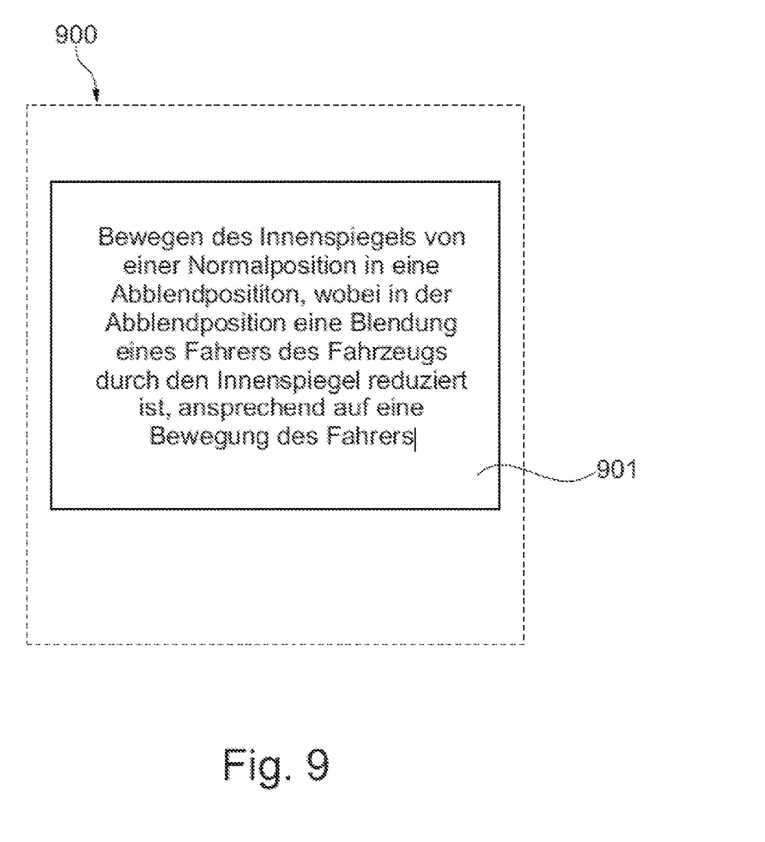
FIG. 9 is a representation of a method according to the invention for gesture-controlled pivoting of an interior mirror for a vehicle.

FIG. 9 shows a schematic representation of a method 900 according to the invention for gesture-controlled pivoting of an interior mirror for a motor vehicle. The method 900 can comprise a movement 901 of the interior mirror from a normal position into the dimming position. Thereby, the interior mirror can be moved from a normal position into the dimming position, in which dazzling of the driver of the motor vehicle by the interior mirror is reduced, in response to a movement by the driver. The movement 901 of the interior mirror can be realised corresponding to the descriptions for FIGS. 1 to 8 above.

The process step 901 can be performed by a computer program product which can be loaded directly into the internal memory in the motor vehicle's on-board computer and comprises software code segments.

It is self-evident that the features of the various embodiments described in this document can be combined with one another unless specifically stated otherwise. As shown in the description and the drawings, individual elements which have been shown in contact do not have to be in direct contact with one another; intermediate elements can be designed between the connected elements. Furthermore, it is self-evident that the embodiments of the invention can be implemented in individual circuits, partially integrated circuits or fully integrated circuits, or means of programming. The term "for example" is intended simply as an example and not as the best or optimal design. Certain embodiments have been illustrated and described here, but it is obvious to an expert in the field that a multitude of alternatives and/or similar implementations can be realised instead of the embodiments shown and described without departing from the concept of this invention.

REFERENCE LIST

1 Driver movement
100 Interior mirror
101 Frame
102 Pivoting device
103 Control unit
104 Wedge mirror
105 Mirror mounting
106 Pivot point
107 Control unit
110 Normal position
112 Dimming position
200 Interior mirror
204 Wedge mirror
207 Sensor device
208 Sensor
209 Sensor
300 Interior mirror
302 Drive
302 Ball joint
303 SMA wire
304 Axle
305 Axle
306 Roll
307 Roll
308 Support plate
309 Base plate
400 Mini yo
403 Wire
406 Thread roll
407 Thread roll
408 Fixation point
409 Power supply
600 Mini yo
603 Wire
606 Roll
607 Roll
608 Fixation point
609 Roll
700 Drive
703 Wire
706 Roll
707 Roll
708 Fixation point
710 Spring element
711 Angle of rotation
801 Sensor device
802 Sensor device
810 TOF camera
811 Light-emitting diode
812 Light-emitting diode
813 Light-emitting diode
814 Light-emitting diode
820 Finger
821 TOF sensor
822 TOF sensor
823 TOF sensor
824 TOF sensor
900 Method
901 Movement

The invention claimed is:

1. A pivotable interior mirror for a motor vehicle, comprising:
a mirror surface in the form of a first surface of a wedge mirror;
a sensor device suitable for a light propagation time measurement for detecting at least one gesture by a driver of the motor vehicle or incidence of light on the first surface of the wedge mirror; and
a pivoting device for pivoting the mirror surface from a normal position into at least one dimming position in which dazzling of the driver by light reflected in the mirror surface is reduced, wherein the pivoting device can be activated in dependence on at least one output signal from the sensor device, and
wherein the sensor device is suitable for a light propagation time measurement and is part of a control unit for the pivoting device, and the control unit detects movement patterns within a first area of the interior mirror or provides at least one virtual button within a second area of the interior mirror.

2. The interior mirror according to claim 1, wherein the sensor device comprises at least one first sensor in the form of a Time Of Flight (TOF) sensor comprising a TOF camera, wherein the sensor device further comprises at least one second sensor to fulfil an ambient light sensor (ALS) function.

3. The interior mirror according to claim 2, wherein
the first sensor is attached to the side of the interior mirror at the mirror surface, and attached to the mirror surface, or
a first second sensor is attached to the side of the interior mirror at the mirror surface, and attached to the mirror surface, or
a second second sensor is attached to the side of the interior mirror opposite the mirror surface, and attached to the side of the wedge mirror opposite the mirror surface,
wherein the first sensor and the first second sensor are preferably designed rolled into one.

4. The interior mirror according to claim 2, wherein
the pivoting device can be activated in dependence on a comparison of output signals from the first and at least one second sensor, through subtraction, or
the pivoting device can be activated in dependence on a comparison of output signals from the first second and the second second sensor, through subtraction.

5. The interior mirror according to claim 1, wherein
the pivoting device can be activated in dependence on signals from a device in the vehicle which is characteristic of lighting conditions in an environment of the motor vehicle, and comprising an illumination device for the motor vehicle in the form of any one or more of headlights, vehicle interior lighting, an internal clock, or a position determination device.

6. The interior mirror according to claim 1, wherein
the control unit detects movement patterns within a first distance interval from the mirror surface or provides at least one virtual button within a second distance interval, wherein the first distance interval is provided in the first area of the control unit and the second distance interval is provided in the second area of the control unit.

7. The interior mirror according to claim 6, wherein the second distance interval is located closer to the mirror surface than the first distance interval.

8. The interior mirror according to claim 1, wherein
the pivoting device comprises a shape memory actuator for pivoting the mirror surface, and
the shape memory actuator comprises a shape memory wire which changes in length in response to a current flow through the shape memory wire.

9. The interior mirror according to claim 8, wherein the control unit supplies the shape memory wire with power from a power supply in the motor vehicle.

10. The interior mirror according to claim 8, wherein
the shape memory wire is coiled on a first thread roll and causes a rotational movement of the first thread roll in response to the current flow, and
the first thread roll forms a drive axle for the interior mirror and is designed to turn the mirror surface by at least a first angle of rotation.

11. The interior mirror according to claim 10, wherein
the shape memory wire is coiled on a second thread roll which turns the mirror surface by at least a second angle of rotation, and
wherein the diameter of the second thread roll is different from the diameter of the first thread roll.

12. The interior mirror according to claim 8, wherein
the pivoting device comprises a further actuator which moves the mirror surface back into the normal position, wherein the further actuator comprises a second shape memory actuator or a spring element.

13. A motor vehicle comprising a pivotable interior mirror according to claim 1, the motor vehicle comprising:
a control device in combination with the sensor device; the pivoting device; and the control unit;
a device which is characteristic for the lighting conditions in the environment of the motor vehicle;
an illumination device in the form of headlights or vehicle interior lighting;
an internal clock; or
a position determination device.

14. A method for pivoting a pivotable interior mirror of claim 1, comprising:
detecting movement by a driver of the motor vehicle and an arm movement by the driver towards the interior mirror or movement of a finger within a certain area of the interior mirror, or
detecting incidence of light on the interior mirror; and
triggering movement of the interior mirror from the normal position into at least one dimming position or from the dimming position into the normal position in dependence on the result of the detection.

15. The method according to claim 14, wherein
a vehicle function, and an adjustment of an illumination device or time information or a vehicle location is capable of being taken into account when changing from the normal position into the dimming position or from the dimming position into the normal position, or
a driver of the vehicle is capable of choosing whether the change from the normal position into the dimming position or from the dimming position into the normal position occurs automatically, via gesture control, or through actuation of a virtual button, and
wherein an automatic change is preferably initiated in response to specific, predefined lighting conditions being detected.

* * * * *